Dec. 31, 1946.   R. W. SKOOG   2,413,586
APPARATUS FOR PRODUCING CARBON BLACK
Filed July 15, 1943
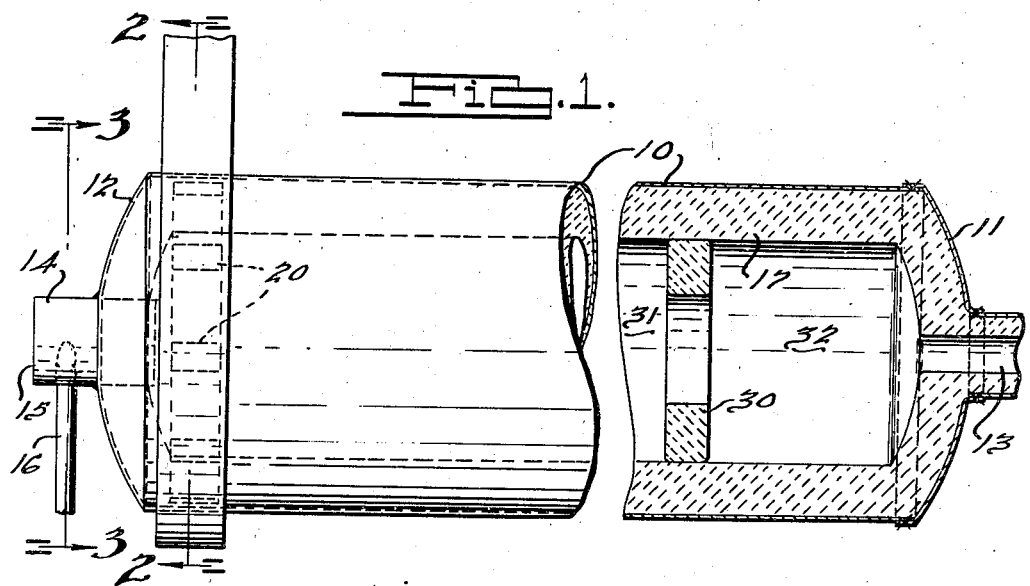
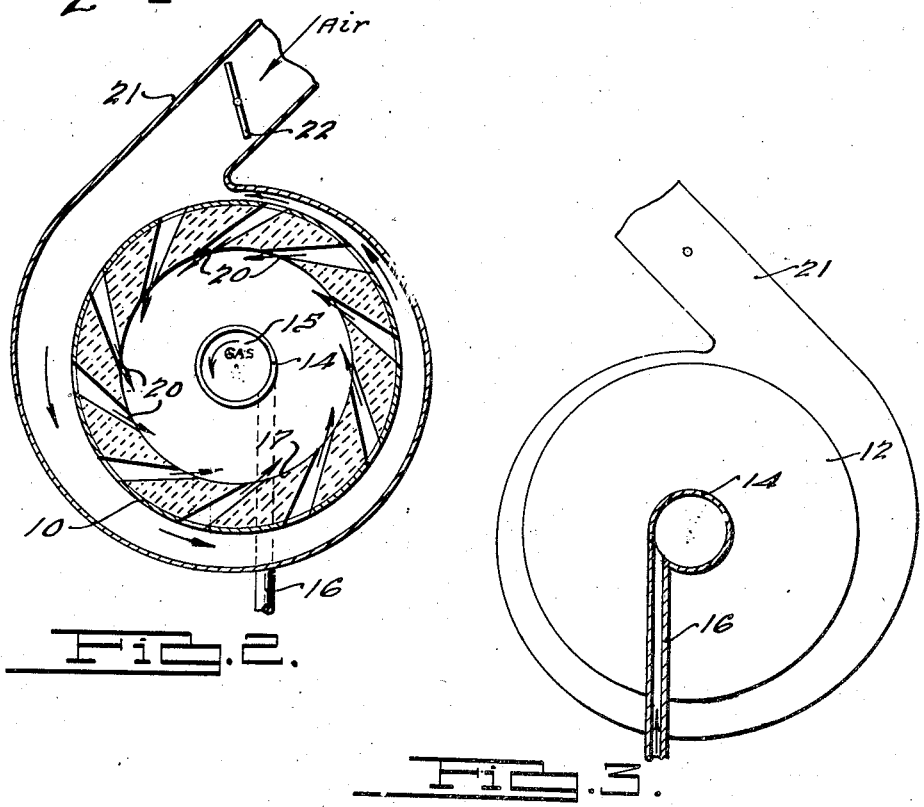
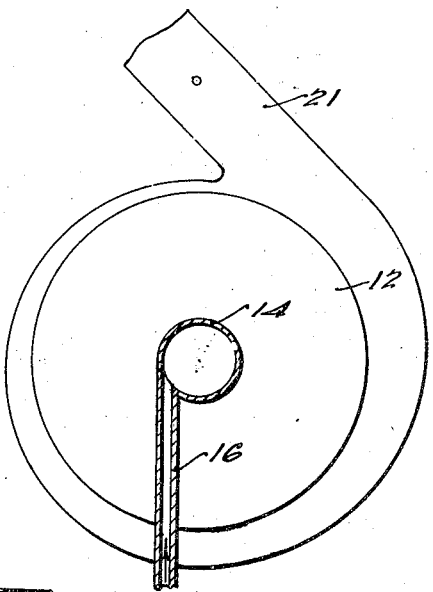
INVENTOR
Robert W. Skoog.
BY
ATTORNEYS.

Patented Dec. 31, 1946

2,413,586

UNITED STATES PATENT OFFICE 2,413,586

APPARATUS FOR PRODUCING CARBON BLACK

Robert W. Skoog, Borger, Tex., assignor to United Carbon Company, Inc. (Maryland), a corporation of Maryland Application July 15, 1943, Serial No. 494,774

6 Claims. (Cl. 23—259.5)

The present invention relates to improvements in apparatus for producing carbon black by the decomposition of hydrocarbon gases, such for example as those contained in natural gas.

One of the objects of the present invention is to provide a novel apparatus to assure the admixture of natural gas and predetermined amounts of air to effect a thermal decomposition of the said gas and the production of carbon black therefrom.

A further object of the invention is to provide a means for introducing natural gas into a converter or furnace so as to effect a substantially uniform admixture of the gas with a predetermined volume of air prior to the decomposition of the natural gas.

Another object of the invention is to provide an improved apparatus for producing carbon black by a continuous process of decomposition of hydrocarbon gases, the apparatus being relatively simple in structure and capable of a sustained and readily controlled operation according to predetermined control factors required to produce various commercially desirable types of carbon black.

A further object of the invention is to provide an improved apparatus for producing carbon black which is adapted to provide a predetermined amount of gas during a predetermined time interval and injecting the gas on a line generally tangential to the periphery of the reaction chamber so as to impart a generally rotary motion to the gas stream, thereby breaking up the gas stream prior to its admixture with air; the present invention also providing an improved method and apparatus for introducing air on lines generally tangential to the inner walls of the reaction chamber through a series of ports, each connected with a manifold designed to provide a substantially constant head of air at the inlet to each of said ports.

Other objects of this invention will appear in the following description and appended claims, reference being had to the accompanying drawing forming a part of this specification wherein like reference characters designate corresponding parts in the several views.

The present invention is an improvement on the apparatus for producing carbon black disclosed in application for U. S. Letters Patent Serial No. 389,522, filed in the names of Hilding Hanson, Robert W. Skoog, and Lolan H. Grisso, and assigned to United Carbon Company, Inc., the apparatus being also adapted for use in connection with the process disclosed in application for United States Letters Patent Serial No. 389,523, for process for producing carbon black, filed in the names of Hilding Hanson and Robert W. Skoog, and assigned to United Carbon Company, Inc.

In the drawing:

Fig. 1 is a fragmentary side elevation, partially in section, of an apparatus for manufacturing carbon black embodying the improvements of the present invention.

Fig. 2 is a sectional view taken substantially on the line 2—2 of Fig. 1 in the direction of the arrows; and Fig. 3 is a sectional view taken substantially along the line 3—3 of Fig. 1 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

The improvements constituting the present invention may be applied to a carbon black converter such as that shown, for example, in Fig. 1, which may comprise an outer steel casing 10 which may be a single tubular member or which may be formed of separate pieces as desired, which may be joined as by welding, riveting, or the like. In the converter construction illustrated in the drawing, the casing 10 is generally circular in cross section, thereby providing a generally cylindrically shaped converter. While this shape is a preferred shape, it will be understood that the converter casing 10 may be of any desired size and shape and consequently may be provided with cross sectional configurations other than circular.

The casing or shell 10 is closed by the ends 11 and 12 which communicate respectively with a flue opening 13 and a gas inlet which comprises a generally cylindrical casing 14 having a closed end 15 and a gas injection pipe 16 which communicates with the chamber 14 as shown in Fig. 3. The chamber 14 opposite the closed end 15 extends through the refractory lining 17 inside the shell 10 of the converter and has an open end which terminates adjacent the air inlet ducts 20.

Air is supplied to the air ducts 20 by means of the manifold 21 which is connected with a suitable source of air under pressure (not shown). The amount of air passing into the manifold 21 is controlled by a valve 22. The air ducts 20 connect the air header 21 with the interior of the converter and each of the air ducts extends on lines generally tangential to the circumference of the inside of the converter. Thus, as indicated by the arrows in Fig. 2, air is introduced through each of the air ducts 20 in a direction generally tangential to the interior circumference of the converter. This provides a whirlpool effect in the air as it is introduced into the converter and in the vortex of this whirlpool the gas, also introduced tangentially of the chamber 14, is introduced. This provides a uniform turbulent admixture of gas and air in the entrance of the converter and this is accomplished by imparting a directional velocity to the gas and the air separately before they are allowed to become admixed in the converter. It has been found that this method eliminates lack of uniformity in the turbulent admixture and in so doing, provides a uniform admixture which is subsequently treated as it continues its movement through the converter. Due to the whirlpool effect of the air as it is introduced into the converter, it will be seen that the gas is instantly drawn out of the gas injection chamber and is immediately diffused into the rapidly moving air stream.

In order to assure a uniform head of air and consequently a uniform distribution of air through the ducts 20 and into the converter, the header or manifold 21 is formed as shown in Fig. 2 in such a manner that the capacity of the header decreases as the volume of air flowing therethrough is decreased by being drawn through the air ducts 20. This provides a construction which in cross section resembles a portion of a spiral as the diameter of the cross-sectional area between the outer wall of the manifold 21 and the wall of the converter 10 gradually decreases in the direction of the air flow.

The progressive decrease in the capacity of the header is approximately proportional to the decrease in volume of the air supplied thereto and thus the velocity of the air is maintained at the ports of each of the ducts 20. Thus by controlling the valve 22 the total volume of air supplied to the manifold is controlled. The manifold 21 acts as a self-metering manifold to provide a substantially constant head of air at each of the air ducts 20.

The refractory material inside the wall 10 and the ends 11 and 12 also extends through the flue 13 and may be formed of any suitable heat-resisting refractory material, such for example as fire brick. It is preferable that the material selected should be able to withstand temperatures as high as approximately 3000° F. without undergoing excessive deterioration.

At a point adjacent the flue 13 a mixing orifice 30, also formed of a suitable refractory material, is placed. This divides the converter into the two sections 31 and 32 which communicate through the annulus in the orifice 30.

While any desired dimensions may be employed in the construction of the apparatus embodying the present invention, it is desirable that the relative diameter of the cylindrical casing 14 of the gas injection portion of the apparatus should be approximately one-third of the diameter of the interior of the converter. In a preferred construction, I have formed the gas injection chamber 14 of tubular metal stock 20 inches in diameter and used this in a combustion chamber having a diameter of 60 inches from wall to wall of the refractory. While this proportion has been found to be desirable, it is to be understood that it may be varied depending upon the results desired.

While in the construction here shown the valve 22 is adapted for manual adjustment, it is to be understood that the valve may be controlled automatically if desired by any of the well-known automatic control mechanisms which may be governed and controlled according to temperatures generated within the converter. Likewise, the amount of gas introduced to the chamber 14 may be regulated by any desired type of automatic gas regulating and metering means.

The operation of the improved apparatus of the present invention is as follows:

Natural gas, maintained at a constant rate and volume, is introduced through the conduit 16 and is baffled and directed by the chamber 14 to form a stream moving circumferentially of the chamber 14. The stream of gas is drawn toward the vortex which is generated in the whirling mass of air in the end of the converter adjacent the open end of the chamber 14. The air is introduced under pressure at a substantially constant rate and volume through the air injection ports 20. The gas and the air are admixed to form a substantially uniform admixture which moves turbulently inside the converter. The gas streams are diffused into and admixed with the swirling mass of air, and when a combustible mixture of air and gas has resulted, it is burned within the converter with a swirling active flame. The flame and the gas and air at the same time move longitudinally of the converter toward the flue 13 which is connected through the carbon collecting system (not shown) with the stack (also not shown).

The burning gases as they traverse the converter are further mixed and blended as they pass the mixing orifice 30. As the mixture enters the chamber 32, a further turbulence is created due to the mixing of the burning gases, the unburned gases, and any air which may not have combined with the gas during its travel through the forepart of the furnace. The products of combustion and the decomposed gases carrying with them the produced carbon black, pass out of the chamber 32 and through the flue 13. The carbon black suspended in the produced gases is then isolated from the gases by any desired separating and collecting apparatus known to the art, such for example as an electric precipitator (not shown).

The amount of air and gas introduced into the combustion chamber is regulated so that the mixture of gas and air is always such that a portion of the gas is not burned but instead is thermally decomposed by the heat supplied by the burned gas and air mixture. Consequently the quantity of air introduced into the chamber is regulated with relation to the amount of gas injected through the gas injecting tube 16. The extent of combustion permitted has been found to affect the type of carbon black produced and thus regulation of the relative amounts of air and gas is determined by the type of carbon black which is to be manufactured.

The selection of the sizes, numbers, and placements of the air inlet ducts is controlled and may be varied to provide a substantially uniform distribution of the air inside the converter at pressures which require relatively low power consumption. The spacing of the air ducts determines to a large extent the uniformity of the air distribution within the combustion chamber while the sizes and numbers of the ducts determine the air pressures required to deliver given volumes of air to the converter during a given time interval. The desired volume of air to be delivered through the ducts in a given time interval is regulated to provide the desired temperatures within the converter.

The air and the gas which are mixed to form a combustible mixture are burned inside the converter with a turbulent active flame. The entire converter is filled with the resultant flame and the products of combustion and decomposition of gas. With this apparatus a thermal type of carbon black is produced in a continuous process which does not required intermittent batch or cyclic operations.

In the construction here provided the combined capacity of the gas and air inlets is greater than that of the flue outlet. This assures a definite control of the temperatures created within the converter for all air supplied thereto is supplied under pressure. The gas and air are admixed prior to combustion at positive pressures which may vary as desired from approximately 1 to approximately 4 inches of water. By thus eliminating negative pressures in the converter it is not necessary to rely upon natural draft as the means of drawing air into the combustion chamber. Thus a positive control of the volume, direction, and velocity of the air is assured. This in turn produces more uniform operation conditions and assures the uniform production of a carbon black product having predetermined and controlled characteristics and yield.

It is desirable to so arrange the air ducts and the gas inlet that the gas and air streams enter the furnace while moving in the same direction. That is, if the air moves clockwise to the center line of the converter, the gas also shows travel in the same direction and vice versa. It is to be understood however, that the direction of travel of the air through the duct 21 may be either clockwise or counterclockwise, to the center line of converter as desired so long as the gas is given the same direction of travel.

I claim:

1. A converter for producing carbon black from hydrocarbon gases, which comprises a substantially cylindrical refractory lined reaction chamber provided at one end with a flue outlet and at the opposite end with separate gas and air inlets, said gas inlet comprising a substantially cylindrical chamber having an open end communicating with the interior of said reaction chamber, and a gas supply pipe opening tangentially into a side of said cylindrical chamber, said air inlets extending into said reaction chamber on lines generally tangential to the circumference of the inner walls of said chamber, a manifold communicating with each of said air inlets and with a source of air under pressure, said manifold having a progressively decreased cubical content in the direction of air flow thereby to supply to each of said inlets a substantially equal volume of air under substantially equal pressures whereby air is supplied to said reaction chamber as a plurality of separate air streams each of which is substantially equal in volume and pressure to the other of the said air streams, and means for separately regulating the relative amounts of gas and air introduced into said reaction chamber.

2. A converter for producing carbon black from hydrocarbon gases, which comprises a refractory lined reaction chamber having a transverse wall therein between its ends, an axial opening through said wall, a flue outlet at one end, a substantially cylindrical gas supply chamber at the opposite end directly and axially opening into said opposite end of said reaction chamber, a gas inlet opening into a side of said cylindrical gas chamber and extending on a line substantially tangential to the circumference thereof, and a plurality of air inlets opening into said reaction chamber at a plurality of spaced points adjacent the opening of said cylindrical chamber into said reaction chamber.

3. A converter for producing carbon black from hydrocarbon gases, which comprises a refractory lined reaction chamber having a transverse wall therein between its ends, an axial opening through said wall, a flue outlet at one end, a substantially cylindrical gas supply chamber at the opposite end directly and axially opening into a side of said cylindrical gas chamber and extending on a line substantially tangential to the circumference thereof, a plurality of air inlets opening into said reaction chamber at a plurality of spaced points adjacent the opening of said cylindrical chamber into said reaction chamber, a manifold connected with a source of air under pressure and with said air inlets, said manifold having a progressively decreasing area in the direction of air flow whereby a substantially constant head of air is supplied to each of said air inlets.

4. A converter for producing carbon black from hydrocarbon gases, which comprises a refractory lined reaction chamber having a transverse wall therein between its ends, an axial opening through said wall, a flue outlet at one end, a substantially cylindrical gas supply chamber at the opposite end directly and axially opening into said opposite end of said reaction chamber, a gas inlet opening into a side of said cylindrical gas chamber and extending on a line substantially tangential to the circumference thereof, and a plurality of air inlets opening into said reaction chamber and extending on lines substantially tangential to the circumference of the inner walls of said reaction chamber at a plurality of spaced points adjacent the open end of said cylindrical chamber.

5. A converter for producing carbon black from hydrocarbon gases, which comprises a refractory lined reaction chamber having a transverse wall therein between its ends, an axial opening through said wall, a flue outlet at one end, a substantially cylindrical gas supply chamber at the opposite end directly and axially opening into said opposite end of said reaction chamber, a gas inlet opening into a side of said cylindrical gas chamber and extending on a line substantially tangential to the circumference thereof, and a plurality of air inlets opening into said reaction chamber and extending on lines substantially tangential to the circumference of the inner walls of said reaction chamber at a plurality of spaced points adjacent the open end of said cylindrical chamber, a manifold connected with a source of air under pressure and said air inlets, said manifold having a progressively decreasing cross-sectional area in the direction of the air flow whereby a substantially constant head of air is supplied to each of said air inlets.

6. A converter for producing carbon black from hydrocarbon gases, which comprises a substantially cylindrical refractory lined reaction chamber provided at one end with a flue outlet and at the opposite end with separate gas and air inlets, a transverse wall in said chamber located between said flue and said inlets and having an axial opening therein, said gas inlet comprising a substantially cylindrical chamber having an open end communicating with the interior of said reaction chamber, and a gas supply pipe opening tangentially into a side of said cylindrical chamber, said air inlets extending into said reaction chamber on lines generally tangential to the circumference of the inner walls of said chamber, and a manifold communicating with each of said air inlets and with a source of air under pressure, said manifold having a cross-sectional area of progressively decreasing dimensions in the direction of air flow thereby to supply to each of said inlets a substantially equal volume of air under substantially equal pressures.

ROBERT W. SKOOG.